United States Patent [19]

Girard et al.

[11] Patent Number: 4,481,038

[45] Date of Patent: Nov. 6, 1984

[54] WATER DISPERSIBLE FATTY ACID BIS-AMIDES

[75] Inventors: Theodore A. Girard; Donald H. Foelsch, both of Williamsport, Pa.

[73] Assignee: Glyco Inc., Williamsport, Pa.

[21] Appl. No.: 509,018

[22] Filed: Jun. 29, 1983

[51] Int. Cl.³ ............................................. C08L 91/06
[52] U.S. Cl. .................................. 106/271; 106/270
[58] Field of Search ................................. 106/272, 271; 260/404.5 R, 404.5 PA; 252/111

[56] References Cited

U.S. PATENT DOCUMENTS

| | | | |
|---|---|---|---|
| 2,404,297 | 7/1946 | Kroll | 260/404.5 R |
| 3,943,066 | 3/1976 | Fusey | 252/111 |
| 3,953,218 | 4/1976 | Pollard | 106/272 |

*Primary Examiner*—Theodore Morris
*Attorney, Agent, or Firm*—Cushman, Darby & Cushman

[57] ABSTRACT

Readily dispersible wax compositions, which may be dispersed in either hot or cold water, are formed from finely divided mixtures of a bis-amide and a dispersing agent in an amount effective for dispersion. The dispersing agent is an acid neutralized salt of a N-[2-(2-hydroxyethylamino)ethyl] saturated fatty acid amide or N-[2-(2-aminoethylamino)ethyl] saturated fatty acid amide.

18 Claims, No Drawings

WATER DISPERSIBLE FATTY ACID BIS-AMIDES

BACKGROUND OF THE INVENTION

The present invention relates to water dispersible forms of alkyl bis-amides of fatty acids (sometimes referred to herein simply as "bis-amides") and the methods of making same. Bis-amides enjoy a wide variety of use. For example, they may be useful an antiblocking agents in adhesives; for powder metallurgy; for lubricating polymer beads (as a flow lubricant); additive for the dispersion of pigments. In addition bis-amides may be useful metal lubricants, e.g. in metal drawing and rolling. These are but a few of the many uses which have been made of bis-amides. In most instances, bis-amides, which are waxes, desirably should be formulated in an aqueous suspension so as to provide a uniform dispersion which upon dilution, if necessary by the user, will provide a uniform coating. The use of aqueous bis-amide dispersions has clear advantages over solvent systems because of the absence of fumes and flammability hazards.

One of the problems attendant to the use of such bis-amides as ethylene bis-stearamide (EBS) arises from the difficulty one commonly experiences in trying to disperse the bis-amides in water. The problem is attributable to the hydrophobic nature, and high melting point (140° to 147° C. for EBS) of the bis-amides. Nevertheless, there is a need for aqueous bis-amide dispersions on an ongoing commercial basis.

One established procedure for dispersing bis-amides is to slowly add the bis-amide in a finely ground state to a hot water solution containing dispersants. Generally, the resulting dispersions have a relatively short life and poor shelf-stability due to the tendency of the bis-amide to settle out of suspension, particularly when diluted. Once separated, the bis-amides are difficult to redisperse. These problems are aggravated by the time required for the finished dispersion to reach its user as well as normal storage. Furthermore, such dispersions, because of their high water content, are costly to transport, and unless properly protected will freeze in cold weather. Alternatively, preparation of satisfactory dispersions using the dry ingredients is generally a difficult and time consuming procedure owning primarily to a lack of proper equipment and know-how on the part of the user.

For these reasons, bis-amide dispersions cannot be prepared by simply heating the wax together with water, or even by melting the wax and adding the melt to the water.

To prepare good, pourable dispersions of bis-amides, it is first necessary to use an effective dispersant, and second, to somehow circumvent the high melting point problem.

Clearly, there is a need for an improved dispersion of bis-amide waxes, in either hot or cold water.

Accordingly, it is the primary object of the present invention to provide bis-amide wax compositions which may be easily and readily dispersed in water.

It is a further object of the present invention to provide dry bis-amide waxes which when mixed with water will form a stable long lasting dispersion.

Still another object of the present invention is to provide a useful method of preparing readily dispersible bis-amide compositions.

These and other objects of the present invention will become more apparent from the discussion which follows.

SUMMARY OF THE INVENTION

We have found that easily and readily dispersed forms of bis-amides can be obtained through intimate blending the bis-amide and an acid neutralized salt of a N-[2-(2-hydroxyethylamino)ethyl] saturated fatty acid amide or N-[2-(2-aminoethylamino)ethyl] saturated fatty acid amide; such as N-[2-(2-hydroxyethylamino)ethyl]stearamide or N-[2-(2-aminoethylamino)ethyl]-stearamide. Generally speaking, the water dispersible wax compositions of the present invention comprise a finely divided powder mixture of an alkyl bis-amide of a saturated fatty acid (natural or synthetic) and a dispersing agent which is the aforementioned acid neutralized salt.

Generally, the dispersible bis-amides prepared in accordance with our invention have the structural formula:

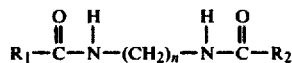

where:

n is an integer from 2 to 6; and $R_1$ and $R_2$ which may be the same or different is a saturated straight or branched chain aliphatic group having from 7 to 21 carbon atoms. The dispersing agent is generally a $C_8$ to $C_{22}$ saturated fatty acid amide. Since it is preferred to prepare both the bis-amide and dispersing agent in-situ, it will be appreciated that in those instances the fatty acid portion of the dispersing agent corresponds to the fatty acid portion of the bis-amide.

The preferred bis-amides treated according to the present invention are those having the structural formula:

where $R_1$ and $R_2$, which may be the same or different are saturated aliphatic groups having from 11 to 21 carbon atoms. This latter group of bis-amides includes those prepared from commercial stearic acid and contain at least about 45% of $R_1$ or $R_2$ having 17 carbons to produce EBS. Corresponding dispersing agents are those of saturated $C_{12}$ to $C_{22}$ fatty acid amides.

The amide salts function as excellent aqueous dispersants for the bis-amides. In addition, by reducing the particle size of the wax composition to a suitable size (e.g. a powder which may range in particle size of from about 2 to 500 microns, and preferably about 5 microns) one greatly enhances the dispersibility of the resulting compositions. Indeed, production of such a finely divided powder eliminates the need for homogenization to produce a stable dispersion.

The preferred dispersant is the lactic acid salt of N-[2-(2-hydroxyethylamino)ethyl]stearamide (HES).

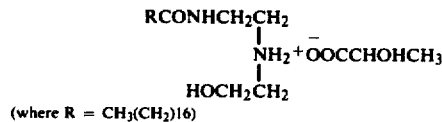

(where R = CH₃(CH₂)₁₆)

Lactic acid salt of N-[2-(2-hydroxyethylamino)ethyl]-stearamide (HES).

HES may be prepared in situ, (e.g. in EBS) by reacting together: stearic acid, ethylene diamine (EDA), N-aminoethyl ethanolamine (AEEA), and neutralizing the product with lactic acid. Other similar reactants may be substituted for these, as for example: lauric acid for stearic acid and diethylene triamine (DETA) for the AEEA. Other neutralizing acids, such as acetic acid, glycolic, HCl, citric and $H_2SO_4$, may be used in place of lactic acid.

The desired form of the ready-to-use dispersible bis-amide composition herein is a dry finely ground powder, preferably having an average particle size of about 5 microns (0.005 mm). This can be achieved by air attrition or other conventional means.

The dispersant should be present in an amount sufficient to disperse the wax composition when placed in water (without the aid of additional dispersants) at a temperature ranging from about 25° to 100° C. We have found that a mole ratio of bis-amide to dispersing agent ranging from about 2:1 to 8:1 to be most effective.

A further embodiment of the present invention provides for a method of making a dry, readily water emulsified wax composition which comprises the steps of:

(a) melt blending a mixture of an alkyl bis-amide of a saturated fatty acid and an acid neutralized salt of N-[2-(2-hydroxyethylamino)ethyl] saturated fatty acid amide or N-[2-(2-aminoethylamino)ethyl] saturated fatty acid amide;

(b) allowing the melted mixture to solidify, and (c) reducing the solidified mixture to a powder (e.g. particle size ranging from about 2 to 500 microns) so as to obtain a dry wax composition which may be readily dispersed in either hot or cold water.

As noted above, the dispersant preferably is generated in situ with the bis-amide, and thus the present invention includes as an embodiment a method of making a dry, readily water emulsified wax composition which comprises the steps of:

(a) reacting a diamine, a $C_8$ to $C_{22}$ saturated straight or branched chain aliphatic fatty acid and an amine selected from the group consisting of aminoethylethanolamine or diethylenetriamine under an inert gas blanket;

(b) thereafter adding to the reaction mixture sufficient acid to neutralize the product of step (a);

(c) cooling the resulting wax to solidify same; and (d) reducing the solidified mixture to a particle size ranging from about 2 to about 500 microns so as to obtain a wax composition which may be readily dispersed in either hot or cold water.

In preparing the bis-amide the preferred diamine is ethylene diamine; the acid may be a $C_{12}$ to $C_{22}$ saturated fatty acid, such as stearic acid. The acid-neutralization may be accomplished using a number of acids such as lactic, glycolic, citric, acetic, hydrochloric and sulfuric acids. However, due to the high volatility of acetic acid and the corrosiveness of hydrochloric and sulfuric acids, lactic, glycolic or citric acid are preferred.

Aqueous dispersions containing up to 25% by weight of the wax compositions have been found both useful and stable.

Thus, bis-amide wax particles may be mixed with hot or cold water to form dispersions of from 1 to 25% of the bis-amide in water. These dispersions are stable and enjoy a comparatively long shelf life. In the dry state, the bis-amide blends are easy and safe to handle.

The following examples are offered to more fully illustrate the invention, but are not to be construed as limiting the scope thereof.

EXAMPLE ONE

A 2 liter flask was equipped with stirrer, thermometer, condenser-assembly (to permit removal of by-product water), and a means of adding both inert gas, and ethylene diamine, under the surface of the melt. The EDA addition rate was controlled by means of a small metering pump.

| Raw Material | Reactants Molecular Weight | Molar Ratio | Grams Charged |
|---|---|---|---|
| Stearic Acid* | 268 | 9 | 1336.5 |
| N—aminoethyl-ethanolamine | 104 | 1 | 57.9 |
| Ethylene Diamine | 60 | 4 | 133.2 |
| Lactic Acid, 88% | 90 | 1 | 56.8 |
| Nitrogen Gas | Surface | Total | 1584.4 |

*Stearic acid used was a commercial grade, and was composed of about 50% stearic acid, 45% palmitic acid, and minor amounts of myristic and oleic acids.

The stearic acid was charged into the flask and melted. During the melting process, and afterwards, a nitrogen gas blanket was used to exclude air. When melted, stirring was begun, and heating continued to a temperature of 90° C.

At 90° C., AEEA was rapidly added (about 1 minute) onto the melt surface. (Other methods of amine addition gave comparable results. For example, combining the AEEA with EDA and adding the mixture, as compared to separate addition, gave equivalent results.) Heating was continued until the reaction temperature of 160° C. was reached.

Ethylene diamine was then metered into the reaction mixture over a period of 4 hours. Heating and stirring were continued at 160° C. Five to six hours after the completion of EDA addition, the amount of unreacted fatty acid was found to be less than 2.5%, and the reaction was considered complete.

The product was rapidly cooled to 150° C., and lactic acid added onto the surface of the melt, as foaming permitted (about 15 minutes). Stirring and heating were continued for an additional 30 minutes at 150° C., to insure complete neutralization of all the free amine present.

The finished wax was poured into metal trays to cool and solidify. The hardened wax was ground to a fine powder having an average particle size of about 5 microns.

Yield data: A total of about 1494.1 grams of product was obtained before grinding.

| | Analysis Unneutralized Before Grinding | Neutralized After Grinding |
|---|---|---|
| Appearance, 25° C. | Waxy Solid | Waxy Powder |

| | Analysis | |
|---|---|---|
| | Unneutralized Before Grinding | Neutralized After Grinding |
| Acid Value (mg.KOH/g.) | 4.7 | 17.7 |
| Neutralization Value (mg.H$_2$SO$_4$/g.) | 21.1 | 14.9 |
| Color of Melt (Gardner) | 5− | 6− |
| Melting Point, °C. | — | 138 |

EXAMPLE TWO

Typical Pilot Plant Batch Procedure

| Raw Material | Molecular Weight | Molar Ratio | Pounds Charged |
|---|---|---|---|
| Stearic Acid | 268 | 8.8 | 500 |
| N—Aminoethyl-ethanolamine | 104 | 1.0 | 22 |
| Ethylene Diamine | 60 | 3.9 | 50 |
| Lactic Acid, 88% | 90 | 1.0 | 21 |
| Carbon Dioxide Gas | Surface | Total | 593 |

A 100 gallon, 316 stainless steel reactor was filled with commercial stearic acid and AEEA.

The reaction mixture was heated to 160° C., under a carbon dioxide gas blanket to exclude air, and EDA metered in beneath the melt surface over a period of 4 hours.

The reaction mixture was maintained at 160° C. for an additional 4 hours, at which time the acid value was 4.6 (2.3% free fatty acid), and the neutralization value 26.0.

After cooling to 150° C., lactic acid (as an 88% solution) was added beneath the melt surface through a dip tube, and after mixing, the dispersible EBS wax was drummed directly into fiber containers and allowed to solidify. The cooled materail was ground by air attrition to an average particle size of 5 microns. Although air milling to approximately 5 microns average particle size is preferred, nevertheless acceptable dispersions can be prepared using any particle size of less than about 500 microns.

| Final Analysis After Grinding | |
|---|---|
| Form | White powder |
| Melt Color (Gardner) | 5+ |
| Acid Value (mg.KOH/g.) | 13.2 |
| Neutralization Value (mg.H$_2$SO$_4$/g.) | 22.0 |
| pH, 5% dispersion | 5.7 |
| Melting Point, °C. | 137.5 |

EXAMPLE THREE

To evaluate the product's water dispersibility, standard 5% dispersions of the products of Examples One and Two were prepared using 25° C. and 60° C. water.

| Water Temperature | Stability of 5% Dispersion |
|---|---|
| 25° C. | Stable |
| 60° C. | Stable |

Both of the dispersions of Examples One and Two were stable overnight.

EXAMPLE FOUR

Water Hardness

Another positive attribute of the dispersible EBS is its immunity to water hardness. Unexpectedly, standard dispersions of good stability were obtained in both soft and very hard water (Table II).

TABLE I

Water Hardness Versus Dispersion Stability

| | Soft (10 mg CaCO$_3$/l) | Hard (300 mg CaCO$_3$/l) |
|---|---|---|
| 5% Dispersion | Stable | Stable |

EXAMPLE FIVE

The role played in stabilizing water dispersion by neutralizing the fatty acid amide was investigated by preparing dispersions of several HES formulations prepared according to the general procedure of Example One.

Neutralization of the free amine group in HES was found to stabilize its water dispersion.

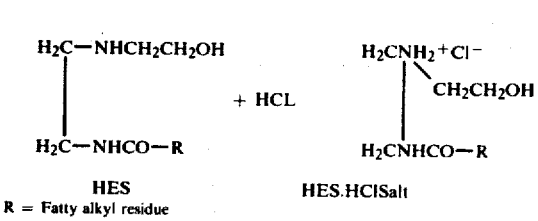

HES  HES.HClSalt
R = Fatty alkyl residue

As shown in Table II, unneutralized material yielded unstable dispersions.

TABLE II

| | Unneutralized | Neutralized With Acetic Acid | Neutralized With Phosphoric Acid |
|---|---|---|---|
| EDA, moles | 2 | 2 | 2 |
| AEEA, moles | 1 | 1 | 1 |
| Stearic Acid moles | 5 | 5 | 4 |
| Neutralizing Acid, moles | — | 0.7 | 0.2 |
| Dispersion Stability | Separated | Stable | Stable |

Neutralization with any one of several acids such as acetic, phosphoric, sulfuric or hydrochloric also stabilized the dispersion. Additional acids which may be used include lactic, glycolic and citric acids. Although effective, volatile acids such as acetic and hydrochloric, may be impractical to use, since much of a volatile acid is lost by vaporization on contacting the EBS melt at 150° C. (acetic acid, for example, boils at only 118° C. at 760 mm pressure). Also, the strong, inorganic acids such as hydrochloric and sulfuric are hazardous to both the reactors as well as operating personnel.

For these reasons, lactic acid, which boils at 122° C. at 15 mm pressure, is seen as a preferred neutralizing agent.

EXAMPLE SIX

AEEA Versus DETA

Substitution of diethylene triamine (DETA) for AEEA in preparing dispersible EBS resulted in a very similar product. The melting point was somewhat lower, but the product gave equally stable water dispersions as shown in Table III below.

TABLE III

| Dispersible EBS Wax Preparation AEEA Versus DETA | | |
|---|---|---|
| Reactant | AEEA | DETA |
| EDA | 2 moles | 2 moles |
| Amine | 1 | 1 |
| Stearic Acid | 5 | 5 |
| Neutralizing Acid | Acetic | Acetic |
| Product | | |
| AV (mg KOH/gram) | 14.8 | 21.0 |
| NV (mg H$_2$SO$_4$/gram) | 14.6 | 29.2 |
| pH (5%) Dispersion | 5.3 | 4.6 |
| Melt Color (Gardner) | 6 | 5+ |
| Melting Point, °C. | 134 | 128 |
| Dispersion | Stable | Stable |

EXAMPLE SEVEN

Effect of Varying Molar Ratio of Diamine to AEEA or DETA

Increasing the ratio of EDA/AEEA from 2 to 8 had no effect on the stability of the product's dispersion as evidence in Table IV below. All entries listed in Table IV were neutralized with acetic acid.

TABLE IV

| EDA To AEEA Ratio Effect on Product Dispersion | |
|---|---|
| Ratio | Dispersion |
| 8/1 | Stable |
| 4/1 | Stable |
| 2/1 | Stable |

EXAMPLE EIGHT

Melt Blended Product 1500 grams of commercially available ethylene-bis-stearamide is charged to a flask together with 300 grams of the lactic acid salt of HES and the mixture heated to 150° C. with stirring to form a uniform melt. The uniform melt is then poured into metal trays to cool and solidify. The hardened blend is then ground to a fine powder (less than 350 mesh) using an air attrition mill.

The invention having been thus described, it will be appreciated that various modifications can be made thereto within the scope of the following claims. Furthermore, the present invention may comprise, consist or consist essentially of the herein recited materials and steps.

We claim:

1. A method of making a readily water dispersible wax composition which comprises the steps of:
   (a) melt blending a mixture of an alkyl bis-amide of a saturated fatty acid and a dispersing agent selected from the group consisting of an acid neutralized salt of a N-[2-(2-hydroxyethylamino)ethyl] saturated fatty acid amide or N-[2-(2-aminoethylamino)ethyl] saturated fatty acid amide;
   (b) allowing the melted mixture to solidify, and
   (c) reducing the solidified mixture to a powder which may be readily dispersed in either hot or cold water.

2. A method according to claim 1 wherein the solidified mixture is reduced to a particle size ranging from about 2 to 500 microns so as to obtain a dry wax composition which may be readily dispersed in either hot or cold water.

3. A method according to claim 1 wherein said bis-amide has the structural formula:

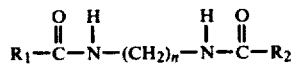

where:
n is an integer from 2 to 6; and
R$_1$ and R$_2$ which may be the same or different is a saturated straight or branched chain aliphatic group having from 7 to 21 carbon atoms and the dispersing agent is a N-[2-(2-hydroxyethylamino)ethyl] C$_8$ to C$_{22}$ saturated fatty acid amide or a N-[2-(2-aminoethylamino)ethyl] C$_8$ to C$_{22}$ saturated fatty acid.

4. A method according to claim 1 wherein said bis-amide has the structural formula:

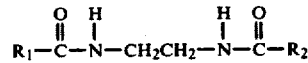

where R$_1$ and R$_2$, which may be the same or different are saturated aliphatic groups having from 11 to 21 carbon atoms and the dispersing agent is a N-[2-(2-hydroxyethylamino)ethyl] C$_{12}$ to C$_{22}$ fatty acid amide or N-[2-(2-aminoethylamino)ethyl] C$_{12}$ to C$_{22}$ fatty acid amide.

5. A method according to claim 4 wherein at least about 45% of R$_1$ or R$_2$ are 17 carbon atoms.

6. A method according to claim 4 wherein the neutralizing acid is selected from the group of lactic, glycolic, citric, acetic, hydrochloric and sulfuric acids.

7. A method according to claim 6 wherein said neutralizing acid is selected from lactic, glycolic and citric acids.

8. A method according to claim 7 wherein the neutralizing acid is a lactic acid.

9. A method according to claim 6 wherein said dispersing agent is present in an amount sufficient to disperse said composition when placed in water at a temperature ranging from about 25° to 100° C.

10. A method according to claim 9 wherein said bis-amide is present in a mole ratio ranging from about 2:1 to 8:1 compared to the dispersing agent.

11. A method of making a readily water dispersible wax composition which comprises the steps of:
   (a) reacting a diamine, C$_8$ to C$_{22}$ saturated straight or branched chain aliphatic acid and an amine selected from the group consisting of aminoethylethanolamine and diethylenetriamine under an inert gas blanket;
   (b) thereafter adding to the reaction mixture sufficient acid to neutralize the product of step (a);
   (c) cooling the resulting wax to solidify same; and
   (d) reducing the solidified mixture to a particle size ranging from about 2 to about 500 microns so as to obtain a wax composition which may be readily dispersed in either hot or cold water.

12. A method according to claim 11 wherein in step (a) said diamine is ethylenediamine, the acid is a $C_{12}$ to $C_{22}$ saturated fatty acid and in step (b) the acid is selected from the group consisting of lactic, glycolic, citric, acetic, hydrochloric and sulfuric acids.

13. A method according to claim 12 wherein the acid in step (b) is selected from the group of lactic, glycolic and citric acids.

14. The method of claim 13 wherein the fatty acid in step (a) is stearic acid and the acid in step (b) is lactic acid.

15. The method of claim 12 wherein the particle size of the dry wax composition is about 5 microns.

16. A stable aqueous wax dispersion comprising the wax composition of claim 2 in an aqueous solution.

17. The stable aqueous dispersion of claim 16 wherein said wax composition is present in an amount up to about 25% by weight.

18. A water dispersible wax composition comprising a finely divided powder mixture of an alkyl bis-amide of a saturated fatty acid and a dispersing agent produced according to the method of any one of claims 1-15.

* * * * *